United States Patent

Onagi et al.

Patent Number: 5,087,340
Date of Patent: Feb. 11, 1992

[54] METHOD OF MAKING MAGNETO-OPTICAL RECORDING DISK

[75] Inventors: Nobuaki Onagi; Shinichiro Suzuki; Seiro Fujii; Takahiro Kobayashi; Takamasa Yoshikawa; Masayasu Yamaguchi; Kiyohide Ogasawara, all of Saitama, Japan

[73] Assignee: Pioneer Electronic Corporation, Tokyo, Japan

[21] Appl. No.: 595,367

[22] Filed: Oct. 10, 1990

[30] Foreign Application Priority Data

Dec. 1, 1989 [JP] Japan ................................. 1-312557

[51] Int. Cl.$^5$ ............................................. C23C 14/34
[52] U.S. Cl. .............................. 204/192.2; 204/192.16; 204/192.22; 204/192.26; 428/694; 428/698
[58] Field of Search ........... 204/192.16, 192.2, 192.22, 204/192.23, 192.26; 428/694, 698

[56] References Cited

U.S. PATENT DOCUMENTS

| | | | |
|---|---|---|---|
| 4,684,454 | 8/1987 | Gardner | 204/192.2 |
| 4,954,232 | 9/1990 | Yamada et al. | 204/192.23 |
| 4,957,604 | 9/1990 | Steininger | 204/192.16 |
| 4,959,136 | 9/1990 | Hatwar | 204/192.15 |

*Primary Examiner*—Aaron Weisstuch
*Attorney, Agent, or Firm*—Fleit, Jacobson, Cohn, Price, Holman & Stern

[57] ABSTRACT

A magneto-optical recording disk comprises a transparent substrate on which a magneto-optical recording layer made of a rare earth-transition metal alloy having an uniaxial magnetic anisotropy is sandwiched by a pair of dielectric layers is characterized that the dielectric layers are deposited in an amorphous state by means of a low pressure sputtering method.

2 Claims, 3 Drawing Sheets

METHOD OF MAKING MAGNETO-OPTICAL RECORDING DISK

BACKGROUND OF THE INVENTION

1. Field of the Invention

The present invention relates to a magneto-optical recording disk of an Erasable Direct Read After Write (E-DRAW) type, and more particularly to a magneto-optical recording disk comprising a thin film formed of an amorphous alloy essentially including rare earth and transition metals, which alloy is a magneto-optical recording material

2. Description of the Prior Art

In prior art techniques for making a magneto-optical recording disk, it is known that a rare earth—transition metal alloy layer formed under pre-selected conditions has an amorphous structure and has a uniaxial magnetic anisotropy i.e. the property of being readily magnetized in a vertical direction to the layer. Such a layer is effective for rotating the plane of vibration of an incident light beam in different directions in dependence upon the magnetized direction. This magneto-optical property is exploited in various magneto-optical recording disks each having a magneto-optical layer laminated with other thin films which have been recently developed. Since such a magneto-optical recording layer is apt to deteriorate due to oxidation, it is sandwiched between a pair of protective layers made of dielectric such as silicon nitride (SiN) or zinc sulfide (ZnS). These protective layers function as a barrier to the humidity passing through the substrate to protect the magneto-optical recording layer. Such layers also conduct a magneto-optical effect to enhance the Kerr rotation angle due to the multi-reflection of the laser beam therein.

A conventional construction of the magneto-optical recording disk is shown in FIG. 1, for example.

Such a magneto-optical recording disk comprises a transparent substrate 1 made of polycarbonate resin etc. on which a first protective layer 2 with the function of enhancing the Kerr-effect, a magneto-optical recording layer 3 made of TbFeCO (terbium-iron-cobalt) ternary alloy etc. and a second protective layer 4 made of dielectric material are disposed in such order as listed. The magneto-optical recording disk may be so constructed that a back plate 7 is adhered via an adhesive layer 6 on the second protective layer 4. A laser beam 8 for recording or reading is irradiated from the substrate 1 side.

The recording and reading of data in the magneto-optical recording disk is performed in the following steps. At first, the amorphous alloy thin file, i.e., the magneto-optical recording layer is uniformly magnetized in a direction vertical to the major surface of the disk. A laser beam is focused onto a small spot on the amorphous alloy thin layer to partly heat the small spot portion so as to raise the temperature of the small spot above the Curie temperature or the compensation temperature thereof while applying a bias magnetic field to the small spot in the direction opposite to the initial magnetization. In the small spot, the orientation of magnetization is reversed by the thermal demagnetization and the inversion of the magnetic pole. In this way, the inverted magnetic domains are formed as small spots in the film plane which has been uniformly magnetized. Secondly, a polarized laser beam is incident to a track made of a train of the inverted magnetic domains. The reading of data on the film plane takes place by utilizing the changes of a rotation of the optic axis and an elliptic ratio of the laser beam which are due to the Kerr effect on the surface of magneto-optical recording layer 4 and the Faraday effect in the Kerr-effect enhancing layer 3. On the basis of these changes, it can be determined whether or not the inverted magnetic domain exists. In this way, the recording and reading of data is performed by assigning the binary "1" and "0" signals to the magnetizing directions.

On the other hand, the conventional protective layers are made of polycrystalline dielectric material. It is a problem that the properties of the magneto-optical recording disk such as the carrier to noise (C/N) ratio becomes low because the irradiated laser beam is scattered by the micro crystalline structure of such protective layers.

SUMMARY OF THE INVENTION

An object of the present invention is to provide a magneto-optical recording disk which has a high C/N ratio and a method of manufacture thereof.

A magneto-optical recording disk according to a first aspect of the present invention, comprises a magneto-optical recording layer made of an amorphous rare earth—transition metal alloy and having a uniaxial magnetic anisotropy in the normal direction of said layer, said magneto-optical recording layer disposed between at least one pair of dielectric layers which are formed on a transparent substrate, wherein said dielectric layers are made in the form of an amorphous state.

According to a second aspect of the present invention, a method of manufacturing a magneto-optical recording disk comprising a magneto-optical recording layer made of an amorphous rare earth—transition metal alloy and having a uniaxial magnetic anisotropy in the normal direction of said layer, said magneto-optical recording layer disposed between at least one pair of dielectric layers which are formed on a transparent substrate, comprises the steps of: introducing a substrate into an airtight vacuum chamber of a thin film forming apparatus for conducting a sputtering method s that said substrate is positioned in a substantially vacuum atmosphere; depositing a dielectric material onto said substrate, characterized by conducting said depositing step under Argon pressure of 0.2 through 1.0 mTorr by a so-called low gas pressure, RF sputtering method, whereby a dielectric layer is produced in an amorphous state; and depositing a rare earth transition metal alloy layer onto said dielectric layer, whereby a magneto-optical recording layer is produced in an amorphous state.

By using the construction of the present invention, the C/N ratio of the magneto-optical recording disk increases.

DESCRIPTION OF THE PREFERRED EMBODIMENT

A preferred embodiment according to the present invention is described with reference to the drawings.

Figure 1:
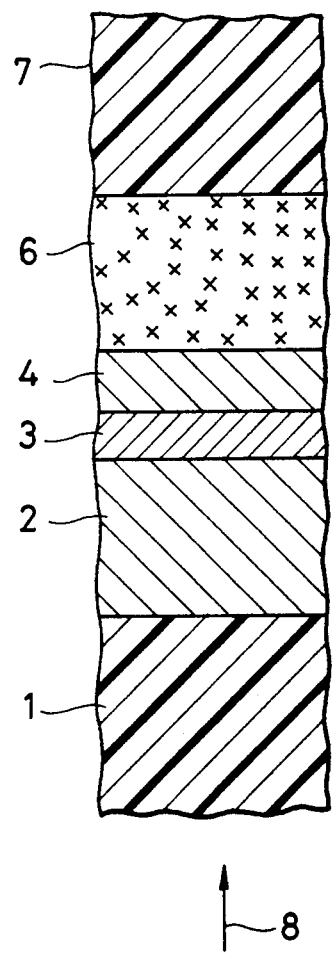
FIG. 1 is a fragmentarily enlarged sectional view of a magneto-optical recording disk.

The construction of the magneto-optical recording disk of the embodiment is the substantially same as that of the disk shown in FIG. 1 except for the crystalline structures of the first and second protective layers 2 and 4. Namely, a magneto-optical recording disk of the embodiment comprises a transparent substrate 1 made of polycarbonate PC, methylmethacrylate PMMA, glass or the like on which a first protective layer 2 made of a dielectric material such as zinc sulfide (ZnS) or the like with the function of enhancing the Kerr-effect, a magneto-optical recording layer 3 made of TbFeCo, GbTbCo or the like, and a second protective layer 4 made of a dielectric material such as ZnS or the like are disposed in the stated order. The magneto-optical recording disk is so constructed that a back plate 7 is adhered via an adhesive layer 6 on the second protective layer 4. At least the second protective layer 4 of dielectric is in an amorphous state in the magneto-optical recording disk according to the present invention. In order to make such a dielectric layer in amorphous form, the depositing step is conducted by a so-called low gas pressure sputtering method so that the dielectric material is deposited as a thin film under a sputtering gas pressure lower than that of the conventional sputtering gas pressure.

Magneto-optical recording disks of both the present invention and the conventional method have been produced in order to compare therebetween. Glass substrates are used for both disks. RF magnetron sputtering apparatus is utilized as a thin film forming apparatus with an airtight vacuum chamber. TbFeCo and ZnS targets are used for both disks. Each of the disks is constructed as a lamination of three layers so that the first ZnS dielectric layer 850 Å thick, the amorphous TbFeCo recording layer 900 Å thick, and the second ZnS dielectric layer 1,000 Å thick are deposited in this order on the glass substrate in the airtight vacuum chamber.

The magneto-optical recording disk according to the present invention and the comparative disk are manufactured by selecting the sputtering gas pressures of Argon in the respective thin dielectric film forming steps to that the crystalline states of dielectric layer are controlled to be crystalline or amorphus. The embodiment of the invention has a dielectric layer formed within the range 0.2-1.0 mTorr Argon (Ar) gas pressure. The comparative disk has a dielectric layer formed within a range greater than 1.0 mTorr Ar gas pressure. A sputtering method in which the sputtering gas pressure is controlled within 0.2-1.0 mTorr, is a so called low gas pressure sputtering method.

Figure 2:
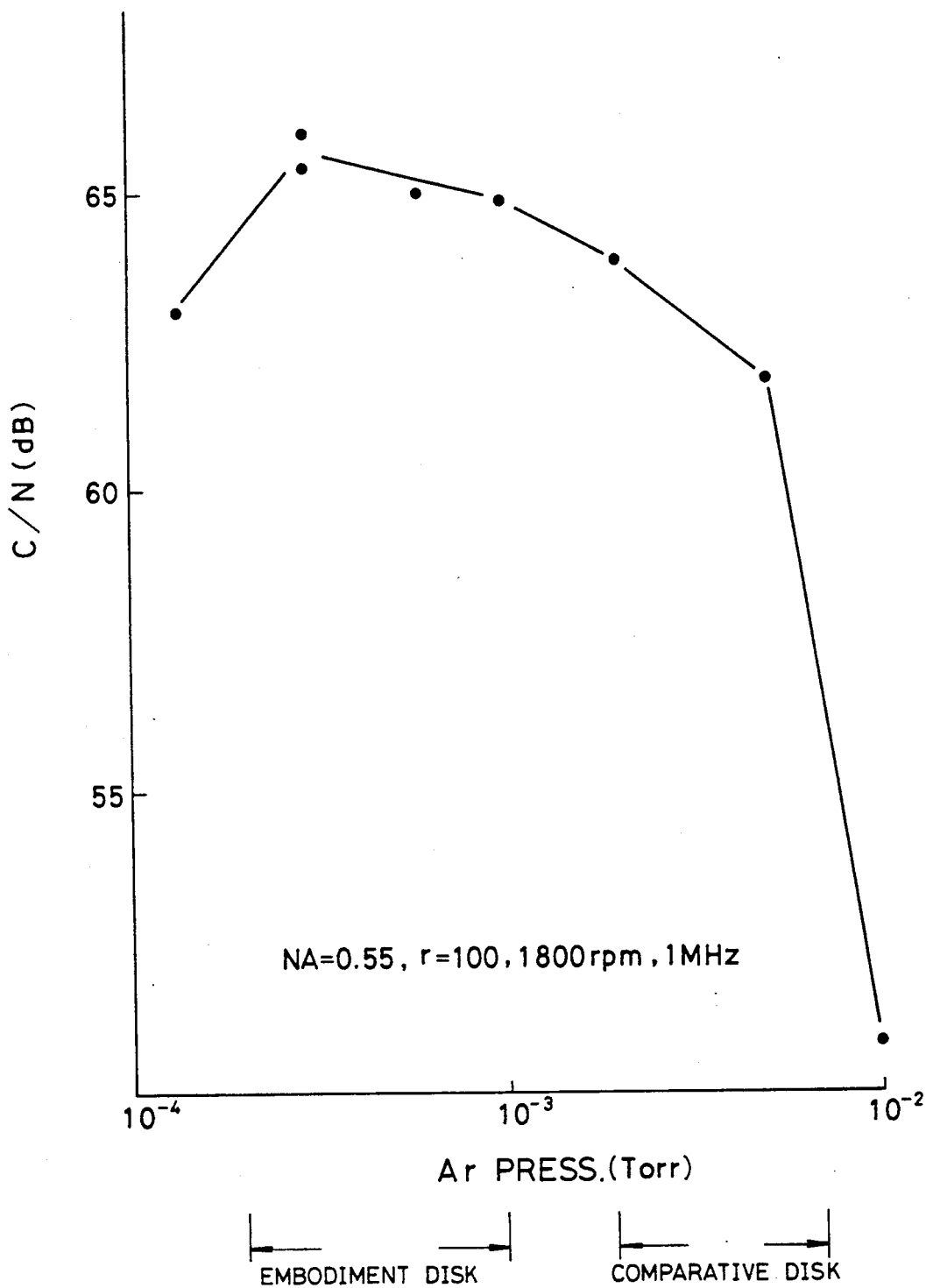
FIG. 2 is a graph showing both changes of C/N ratios while varying the Argon gas pressure in the sputtering apparatus, with respect to the magneto-optical recording disk according to the present invention and the conventional magneto-optical recording disk as a comparison.

FIG. 2 shows the relationship between the pressure of Argon gas in the airtight vacuum chamber and the C/N ratios of the resulting magneto-optical recording disk according to the present invention and the comparative disk. It is apparent that the embodiment of the invention within the range 0.2-1.0 mTorr Ar gas pressure represents a high C/N ratio greater than about 65 dB.

Figure 3:
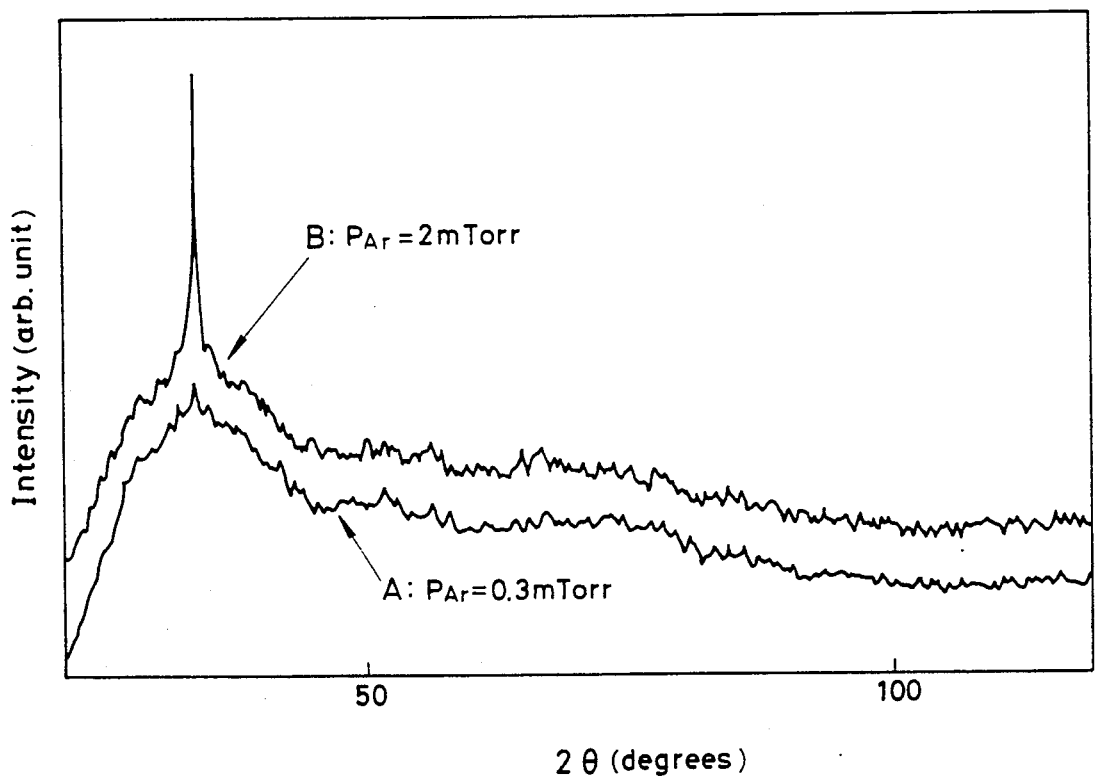
FIG. 3 is a graph showing X-ray diffraction patterns of zinc sulfide (ZnS) films of both the magneto-optical recording disk according to the present invention and the conventional magneto-optical recording disk.

A magneto-optical recording disk has been manufactured in such a manner that the dielectric layer is deposited under an Ar pressure of 0.3 mTorr during the deposition step thereof. A comparative magneto-optical recording disk has been manufactured in such a manner that the dielectric layer is deposited under an Ar pressure of 2 mTorr during the deposition step thereof. The ZnS films of the embodiment and the comparative optical recording disks were measured by the X-ray diffraction method. FIG. 3 shows two X-ray diffraction patterns of such ZnS films, in which curve A represents the pattern of the embodiment of the invention and curve B represents the pattern of the comparative disk. A comparison of these two diffraction patterns shows that the curve B of 2 mTorr Ar pressure has a high peak representing a polycrystalline ZnS film in the comparative disk. On the other hand, the curve A of 0.3 mTorr Ar pressure has no such peak. This means that the ZnS film of the embodiment of the invention has an amorphous structure. Therefore it is assumed that the scattering of light due to the polycrystalline ZnS film is avoided in such an embodiment having the amorphous ZnS film.

Although the embodiment disk has the same structure shown in FIG. 1, a reflection layer may be disposed between the second protective layer 4 and the adhesive layer 6. Suitable guiding grooves of spiral or coaxial circles for guiding a laser beam for recording or reading may be also formed on the major surface of the substrate.

As mentioned above, it is appreciated that the magneto-optical recording disk according to the present invention having a recording layer disposed between at lease one pair of amorphous dielectric layers, so that the C/N ratio thereof is improved. Such a magneto-optical recording disk of high C/N is easily produced merely by controlling the sputtering Ar gas pressure in the sputtering apparatus.

What is claimed is:

1. A method of manufacturing a magneto-optical recording disk comprising a magneto-optical recording layer made of an amorphous rare earth-transition metal alloy having a uniaxial magnetic anisotropy in the normal direction of said layer, said magneto-optical recording layer disposed between at least one pair of dielectric layers made of zinc sulfide and formed over a transparent substrate, which comprises the steps of:

introducing said transparent substrate into an airtight vacuum chamber of a thin film forming apparatus for conducting a sputtering method so that said substrate is positioned in a substantially vacuum atmosphere;

sputter depositing zinc sulfide onto said substrate under an Argon pressure of 0.2 through 1.0 mTorr, whereby a first zinc sulfide layer is produced in an amorphous state;

sputter depositing a rare earth-transition metal amorphous alloy onto said first zinc sulfide layer, whereby a magneto-optical recording layer is produced;

sputter depositing zinc sulfide onto said magneto-optical recording layer under an Argon pressure of 0.2 through 1.0 mTorr, whereby a second zinc sulfide layer is produced in an amorphous state, and wherein the manufactured magneto-optical recording disk has a high C/N ratio greater than 65 dB.

2. A method recording disk according to claim 1 wherein said Argon pressure is 0.3 mTorr.

* * * * *